United States Patent [19]
Bough

[11] 3,927,899
[45] Dec. 23, 1975

[54] VEHICLE STEERING APPARATUS
[75] Inventor: Dale E. Bough, West Lafayette, Ind.
[73] Assignee: TRW Inc., Cleveland, Ohio
[22] Filed: Mar. 22, 1974
[21] Appl. No.: 453,871

[52] U.S. Cl. .............. 280/87 A; 64/2 P; 74/501 R; 180/89 A; 280/96
[51] Int. Cl.$^2$ ...................... F16C 1/02; B62D 3/02
[58] Field of Search .................. 280/87 R, 87 A, 96; 180/89 A; 74/501 R; 64/2 R, 2 P

[56] References Cited
UNITED STATES PATENTS

| | | | |
|---|---|---|---|
| 1,710,237 | 4/1929 | Ohlson | 64/2 P |
| 2,709,070 | 5/1955 | Bielstein | 64/2 R |
| 2,937,881 | 5/1960 | Norrie | 180/89 A X |
| 3,083,031 | 3/1963 | Elwell | 280/96 |
| 3,505,897 | 4/1970 | Scheffler | 280/87 R X |
| 3,633,933 | 1/1972 | Millard | 280/96 |

FOREIGN PATENTS OR APPLICATIONS

| | | | |
|---|---|---|---|
| 116,632 | 10/1929 | Austria | 64/2 P |

*Primary Examiner*—Leo Friaglia
*Assistant Examiner*—John P. Silverstrim

[57] ABSTRACT

An improved vehicle steering apparatus includes a flexible torque transmitting assembly which is capable of transmitting rotational motion along a curved path from an input member connected with a steering wheel to a mechanism for turning the wheels. The torque transmitting assembly includes a series of elements which are disposed in a row. The elements have intermeshing teeth which enable them to transmit torque from one element to another as they are rotated upon rotation of the steering wheel. The torque transmitting elements are enclosed in a flexible tubular casing and are held against sideways movement relative to each other by a flexible central cable or shaft.

8 Claims, 11 Drawing Figures

VEHICLE STEERING APPARATUS

BACKGROUND OF THE INVENTION

This invention relates generally to a steering system and more specifically to a steering system having an improved torque transmitting assembly.

In many vehicles the steering system includes a steering wheel and a mechanism for turning the wheels of the vehicle upon rotation of the steering wheel. Due to cramped engine compartments and other considerations, the steering mechanism may be offset to one side of the axis of rotation of the steering wheel. For example, when rack and pinion type steering is utilized, it is a common practice to locate the rack and pinion mechanism on or near the center of the vehicle. Of course, the steering wheel and steering column are offset to one side of the center of the vehicle. Heretofore, a relatively complex arrangement of rotatable shafts interconnected by universal type couplings or joints have been utilized to transmit motion from the steering column to the axially offset steering mechanism. Of course, the design, fabrication, and maintenance of such a system of rotatable shafts and joints is relatively difficult and expensive.

In other known vehicles, a steering mechanism has been connected with an axle of the vehicle so that as the axle moves up and down relative to the frame of the vehicle, the steering mechanism moves up and down. Since the axis of rotation of the steering wheel is disposed in a fixed relationship with the frame of the vehicle, some arrangement must be provided to enable the steering mechanism mounted on the axle of the vehicle to move up and down relative to the frame even though the steering column remains stationary.

In still other vehicles, such as relatively large trucks, an operator's cab can be tilted or pivoted relative to the frame of the vehicle to provide access to an engine mounted under the operator's cab. As the operator's cab is tilted, the steering wheel and steering column are moved relative to a steering mechanism. This requires a linkage arrangement, between the steering wheel and steering mechanism, which is capable of transmitting rotational movement and enabling the steering wheel to move with the operator's cab.

SUMMARY OF THE PRESENT INVENTION

The present invention provides a new and improved steering system which includes a torque transmitting assembly which enables rotational motion to be transmitted along a curved path from a steering column to a steering mechanism, such as a rack and pinion gear arrangement, which is axially offset from the steering column. This torque transmitting assembly can also be utilized to transmit rotational motion from a steering column connected in a fixed relationship with the frame of a vehicle to a steering mechanism which moves up and down with a wheel or axle relative to the frame of the vehicle. In addition, this torque transmitting assembly can be utilized to transmit rotational motion from a steering column which can be moved relative to a steering mechanism and frame of the vehicle, for example when an operator's cab is tilted to provide access to an engine.

The improved torque transmitting assembly interconnects a steering column shaft and a steering mechanism. The torque transmitting assembly includes a series of rotatable elements or bodies which are disposed in a continuous row. This continuous row of torque transmitting bodies may extend along a curved path. Upon rotation of the steering shaft, force transmitting surfaces associated with opposite ends of each of the bodies are effective to transmit rotational motion from one body to the next adjacent body.

Accordingly, it is an object of this invention to provide a new and improved steering system having a torque transmitting assembly which is capable of transmitting rotational movement along a curved path extending between a steering column shaft and a steering mechanism.

Another object of this invention is to provide a new and improved steering system in which a torque transmitting assembly transmits rotational motion from a steering column shaft to a steering gear assembly and wherein the torque transmitting assembly includes a series of rotatable bodies disposed in a continuous row along a nonlinear path with each of the bodies being rotatable about its central axis to transmit rotational motion from a preceding body to a next succeeding body.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
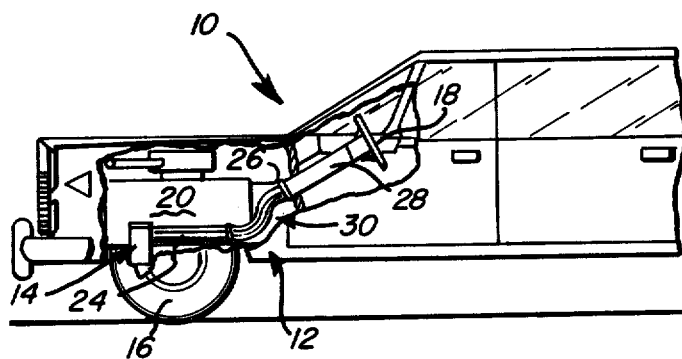
FIG. 1 is a schematic illustration of a vehicle having a steering system constructed in accordance with the present invention.

A vehicle 10 having a steering system 12 constructed in accordance with the present invention is illustrated schematically in FIG. 1. The steering system 12 includes a steering mechanism 14 which is effective to turn front wheels 16 of the vehicle upon rotation of a steering wheel 18. Although it is contemplated that many different types of steering mechanisms could be utilized, the steering mechanism 14 is of the known rack and pinion type and is disposed midway between the front wheels 16 beneath the engine 20. Therefore, the axis of rotation of a generally horizontal input shaft 24 to the steering mechanism 14 is both vertically and horizontally offset relative to the axis of rotation of a shaft 26 connected with the steering wheel 18 through a steering column 28.

In accordance with a feature of the present invention, an improved torque transmitting assembly 30 is utilized to transmit rotational movement along a curvilinear path extending from the rotatable steering shaft 26 to the rotatable input member 24 which is connected with the pinion gear of the rack and pinion steering mechanism 14. The torque transmitting assembly 30 (see FIG. 2) includes a plurality of rotatable torque transmitting bodies or balls 34 which are disposed in a continuous row. An input member or adapter 38 is fixedly connected with the rotatable input shaft 26 (FIG. 1) so that the adapter rotates about its central axis 42 upon rotation of the steering wheel 18 and shaft 26. An inner end portion 46 of the adapter is effective to transmit rotary motion to the first body 34 in the series of torque transmitting bodies. An output member or second adapter 50 (FIG. 2) includes an outer end portion or sleeve 52 which is fixedly connected with the input shaft 24 to the steering mechanism 14 (see FIG. 1). The adapter 50 has an inner end portion 56 which is rotated by the last torque transmitting body 34 in the series 60 of torque transmitting bodies upon rotation of the input adapter 38.

To enable the torque transmitting assembly 30 to be utilized in a steering system in which the steering mechanism 14 is disposed in a somewhat different relationship relative to the steering wheel 18, the series 60 of torque transmitting bodies 34 are enclosed within a flexible tube or casing 64 which can be formed to any one of many different configurations. Once the torque transmitting assembly 30 has been positioned relative to the input shaft 26 and steering mechanism 14, the tubular casing 64 is held against movement by suitable clamps 68. Of course, the torque transmitting assembly can be adapted for use in one specific steering system by making the tubular casing 64 of a rigid material bent to conform with the curved path required by the location of the steering mechanism 14 relative to the steering column 28 and engine 20.

Since it is contemplated that the assembly 30 will be utilized to transmit relatively large torques between the shaft 26 and steering mechanism 14, a flexible shaft or cable 72 made of wound wire extends through central openings 84 to hold the bodies 34 against sidewise movement. The cable 72 is connected with the input adapter 38 by a locknut 74 and washer 76. The opposite end of the cable 72 is connected with the output adapter 50 by a locknut 78 and washer 80. The clamping force and preload on the bodies 34 can be adjusted by adjusting one of the nuts 74 or 78. Of course, if desired, a relatively rigid shaft could be utilized in place of the cable 72.

Figure 3:
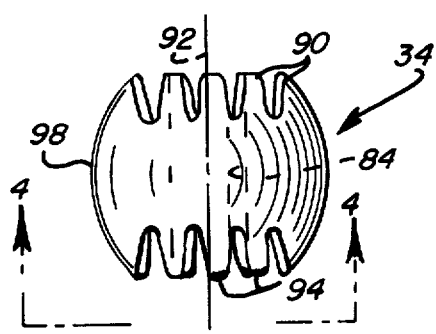
FIG. 3 is an enlarged illustration of a torque transmitting body or element utilized in the assembly of FIG. 2.

Each of the torque transmitting bodies 34 is rotated about its central axis by the torque transmitting body which precedes it in the series 60 of transmitting bodies. As each torque transmitting body is rotated, it is effective to rotate the next succeeding transmitting body 34 in the series 60 of torque transmitting bodies. To provide for the transmission of rotational movement of one body 34 to the next succeeding body, each of the bodies 34 is provided with a first set of teeth 90 (FIG. 3) which is driven upon rotation of the input member 38. Each of the bodies 34 includes a second set of teeth 94 on the opposite end of the body 34. The second set of teeth 94 on each body 34 is effective to drive the next succeeding body 34 in the series 60 of torque transmitting bodies. The two sets of teeth 90 and 94 are of identical configuration and each includes an annular array of teeth which extent radially outwardly from the opening 84. This enables a body 34 to be positioned in the series 60 with either the set of teeth 90 or the set of teeth 94 in engagement with a set of teeth on a next adjacent torque transmitting body.

Figure 4:
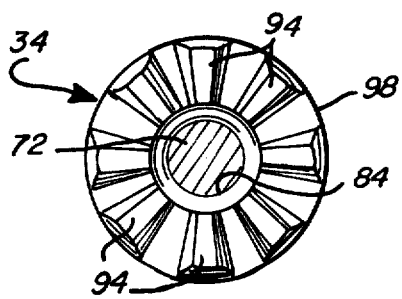
FIG. 4 is a plan view, taken generally along line 4—4 of FIG. 3, illustrating the arrangement of force transmitting surfaces or teeth on one end of the body.

To facilitate rotation of the torque transmitting bodies 34 within the flexible tube or casing 64, the bodies are provided with an outer surface 98 (FIGS. 3 and 4) which forms a portion of a sphere. The surface 98 tapers or slopes radially inwardly toward the teeth 90 and 94 at the opposite ends of the body. Therefore, only the circular central portion of the surface 98 is in engagement with the circular inner surface of a wall of the casing 64 to minimize friction between the torque transmitting body 34 and the casing.

Figure 2:
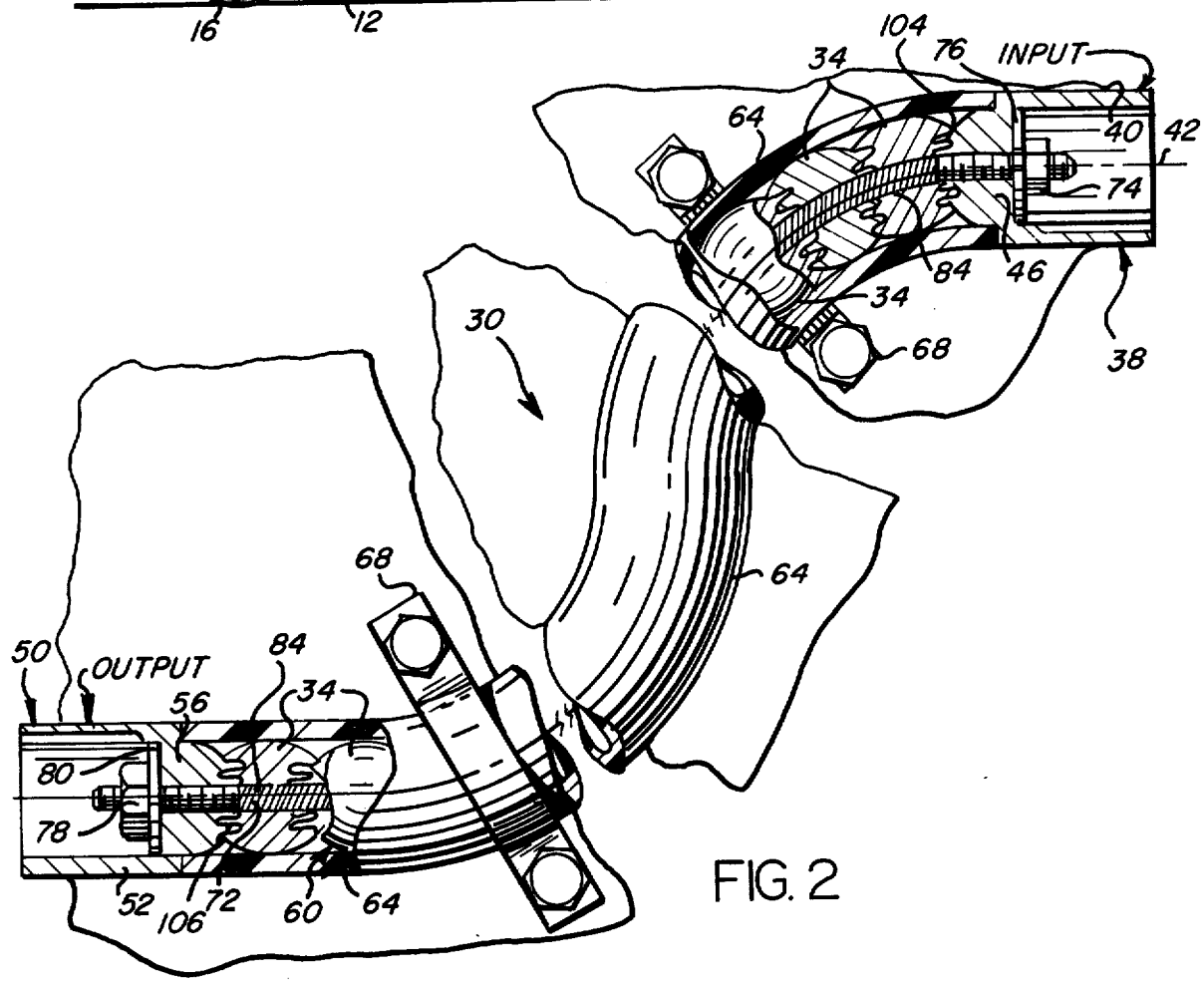
FIG. 2 is a partially broken-away, enlarged sectional view of a torque transmitting assembly utilized in the steering system of FIG. 1.

The generally spherical configuration of the surface 98 also enables the torque transmitting bodies 34 to rock or twist slightly relative to each other as the casing 64 is flexed. Thus, when the casing 64 is flexed to either a greater or lesser extent than is shown in FIG. 2, the torque transmitting bodies 34 rock or rotate about a central axis extending perpendicular to the central axis 92. This results in a greater extent of meshing engagement between the teeth 90 and 94 on the inside of an arc or radius of curvature of the casing 64 than on the outside. However, the teeth 90 and 94 have a sufficient axial extent to remain in mesh, at least to a limited extent, on the outside of the radius of curvature of the casing.

To drive the first torque transmitting body 34 in the series 60 of torque transmitting bodies, the input adapter 38 is provided with an annular array of teeth 104 which mesh with the annular array of teeth 90 on the first torque transmitting body 34 in the series 60 of torque transmitting bodies. Therefore, upon rotation of the input adapter 38 about its central axis, the teeth 104 rotate the first torque transmitting body 34 to thereby effect rotation of the other torque transmitting bodies in the series 60. Similarly, the output adapter 50 is provided with an annular array of teeth 106 which are in meshing engagement with the annular array of teeth 94 on the last torque transmitting body 34 in the series 60 of torque transmitting bodies. Thus, upon rotation of the input adapter 38, the teeth 104 rotate the first torque transmitting body 34 in the series 60 of torque transmitting bodies. This rotational movement is transmitted by the other torque transmitting bodies in the series 60 of torque transmitting bodies to the teeth 106 on the output adapter 50.

The amount of lost motion or play between the input adapter 38 and output adapter 50 is relatively small. This is because there is very little backlash between the teeth 90 and 94 on the torque transmitting bodies 34. The relatively small amount of backlash which is present between the torque transmitting bodies 34 is the same whether the input adapter 38 is turned in either a clockwise or counterclockwise direction. Therefore, upon turning of the steering wheel 18 (see FIG. 1) through a relatively small arc in a clockwise direction, the resulting rotation of the input adapter 38 is effective to take up any lost motion between the input adapter and the output adapter 50. The same relatively small arc of play or lost motion is present when the steering wheel 18 is turned in the counterclockwise direction with a resulting countercockwise rotation of input adapter 38. It should be noted that the teeth 90 and 94 on the torque transmitting bodies 34 provide a strong positive drive between the steering wheel 18 and steering mechanism 14 when the steering wheel is turned in either a clockwise or counterclockwise direction.

In the embodiment of the invention illustrated in FIGS. 1 through 4 the metallic torque transmitting bodies 34 are formed with annular arrays of teeth 90 and 94 which provide a positive drive between the input adapter 38 and output adapter 50. However, it is contemplated that other types of force transmitting connections could be provided between the torque transmitting bodies 34. Thus, in the embodiment of the invention illustrated in FIG. 5, generally spherical torque transmitting bodies 120 are each provided with a single arcuate tooth 122 which extends from one end of the torque transmitting body. In addition, each of the metallic torque transmitting bodies 120 is provided with a single arcuate groove 124 which is formed in the end portion of the torque transmitting body 120 opposite from the tooth 122. The grooves 124 in the torque transmitting bodies 120 have the same cross sectional configuration as do the teeth 122.

To enable the series 126 of torque transmitting bodies 120 to be flexed, the single tooth 122 on each of the torque transmitting bodies 120 has a longitudinal central axis which extends perpendicular to a longitudinal axis of the groove 124 in the opposite end of the torque transmitting body 120. This enables one of the torque transmitting bodies 120 to be rocked or rotated about a first axis which extends perpendicular to the longitudinal central axis 128. The next adjacent torque transmitting body 120 is capable of being rocked or rotated or about a second axis which extends perpendicular to both the axis 128 and the axis about which the other torque transmitting body is rotated. Thus, the uppermost (as viewed in FIG. 5) torque transmitting body 120 can be rotated to either the left or right (as viewed in FIG. 5). The next adjacent or central torque transmitting body is capable of being rotated or rocked into and out of the plane of the sheet of drawings (as viewed in FIG. 5). This is because the longitudinally extending tooth 122 on the last (as viewed in FIG. 5) torque transmitting body 120 holds the central torque transmitting body against sidewise movement. However, since the longitudinal axis of the tooth 122 on the central torque transmitting body 120 extends parallel to the plane of the sheet of drawings, the tooth 122 on the central torque transmitting body is ineffective to hold the first or uppermost torque transmitting body 120 against sidewise movement along a path extending parallel to the sheet of drawings.

Figure 5:
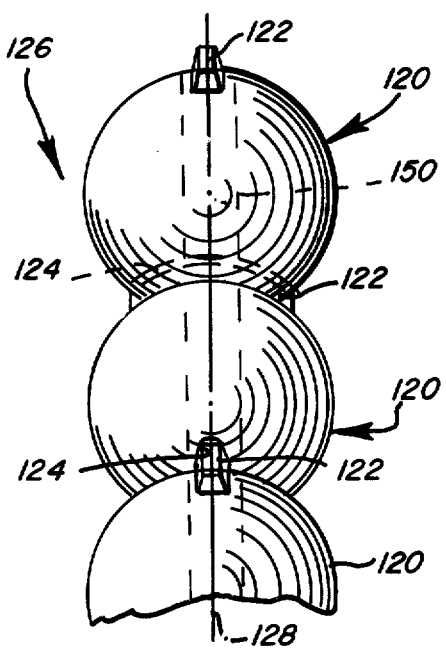
FIG. 5 is an enlarged illustration of torque transmitting bodies or elements utilized in a second embodiment of the invention.
Figure 6:
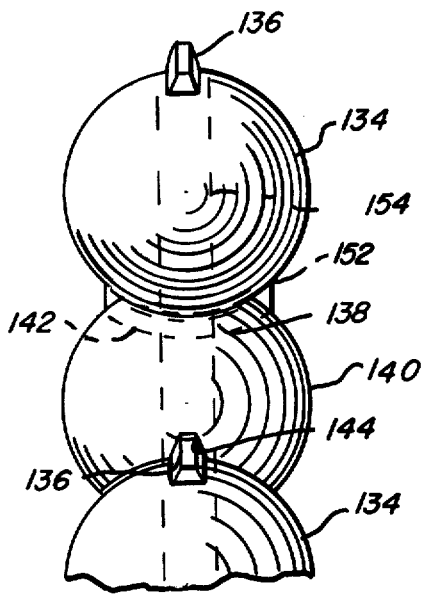
FIG. 6 is an enlarged illustration, generally similar to FIG. 5, illustrating the construction of torque transmitting bodies or elements utilized in another embodiment of the invention.

In the embodiment of the invention illustrated in FIG. 5, the torque transmitting bodies 120 all have the same identicall configuration, that is each of the torque transmitting bodies is provided with a tooth 122 extending out of one end of the torque transmitting body and a groove 124 formed in the opposite end of the torque transmitting body. In the embodiment of the invention illustrated in FIG. 6, the torque transmitting bodies have different configurations. Thus, the metallic torque transmitting bodies 134 are provided with teeth 136 and 138 which extend perpendicular to each other. The teeth on the identically shaped torque transmitting bodies 134 are disposed in engagement with grooves formed on metallic torque transmitting bodies 140 (only one of which is shown in FIG. 6). Thus, the torque transmitting bodies 140 are formed with a first groove 142 which receives the tooth 138 of the next adjacent torque transmitting body 134 and a second groove 134 receives the tooth 136 of the other adjacent torque transmitting body 134. Although the grooves 142 and 144 have the same cross sectional configuration, they have longitudinal axes which extend perpendicular to each other. This enables the upper torque transmitting body (as viewed in FIG. 6) to move toward either the left or the right (as viewed in FIG. 6). The lower torque transmitting body 134 (as viewed in FIG. 6) is capable of moving into and out of the plane of the sheet of drawings.

Although the two series of torque transmitting bodies have been shown in FIGS. 5 and 6 apart from a casing or housing, it should be understood that they will be enclosed in a casing similar to the casing 64 of FIG. 2. In addition, it should be understood that a flexible shaft, similar to the flexible wound wire shaft 72, will be provided through central openings 150 of the torque transmitting bodies 120 and through central openings 152 and 154 in the torque transmitting bodies 154. It should be understood that the length of a torque transmitting assembly 30 containing the torque transmitting bodies of either FIGS. 3, 5, or 6, could be varied by merely adding or substracting torque bodies and making a corresponding adjustment in the length of the tubular casing 64 and the flexible center shaft 72.

Figure 7:
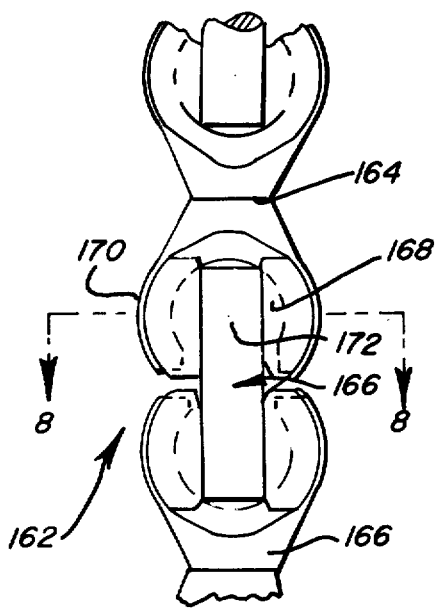
FIG. 7 is an enlarged illustration of torque transmitting bodies or elements forming another embodiment of the invention.
Figure 8:
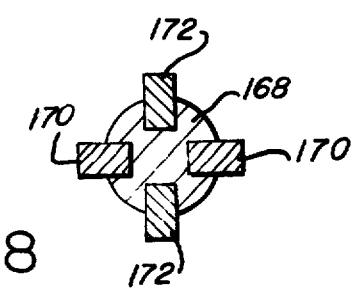
FIG. 8 is a sectional view, taken generally along the line 8—8 of FIG. 7.

In the embodiment of the invention illustrated in FIGS. 7 and 8, the universal coupling 162 interconnects a pair of torque transmitting bodies 164 and 166. The universal coupling 162 includes a sphere 168 which is engaged by a yoke 170 on the torque transmitting body 164 and a yoke 172 on the torque transmitting body 166. The two yokes 170 and 172 extend into slots within the sphere and upon rotation of one of the torque transmitting bodies 164 or 166, rotational movement is imparted to the other torque transmitting body.

Although the two torque transmitting bodies 164 and 166 have been shown apart from a casing or housing, it should be understood that they will be enclosed in a casing similar to the casing 64 of FIG. 2. Also, if desired, a flexible shaft, similar to the flexible would wire shaft 72, could be provided through the center of the torque transmitting bodies 164 and 166. This flexible shaft would extend through an opening in the sphere 168.

Figure 9:
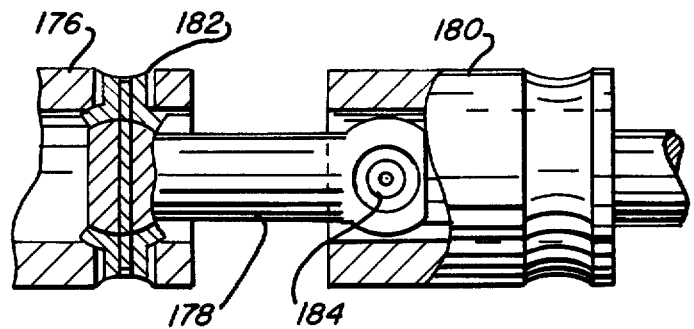
FIG. 9 is a fragmentary sectional view of another embodiment of the invention.

In the embodiment of the invention illustrated in FIG. 9, torque transmitting bodies 176, 178 and 180 are interconnected at pivot connections 182 and 184. The pivot connections 182 and 184 enable the torque transmitting bodies 176, 178 and 180 to move relative to each other so that rotary motion can be transmitted along a curved path from one of the torque transmitting bodies to the next adjacent torque transmitting body. Although only three torque transmitting bodies have been shown in FIG. 9, it should be understood that a plurality of torque transmitting bodies will form a continuous series interconnecting a steering shaft, similar to the steering shaft 26 of FIG. 1, and an input shaft, similar to the input shaft 24 of FIG. 1, connected with a suitable steering mechanism.

Figure 10:
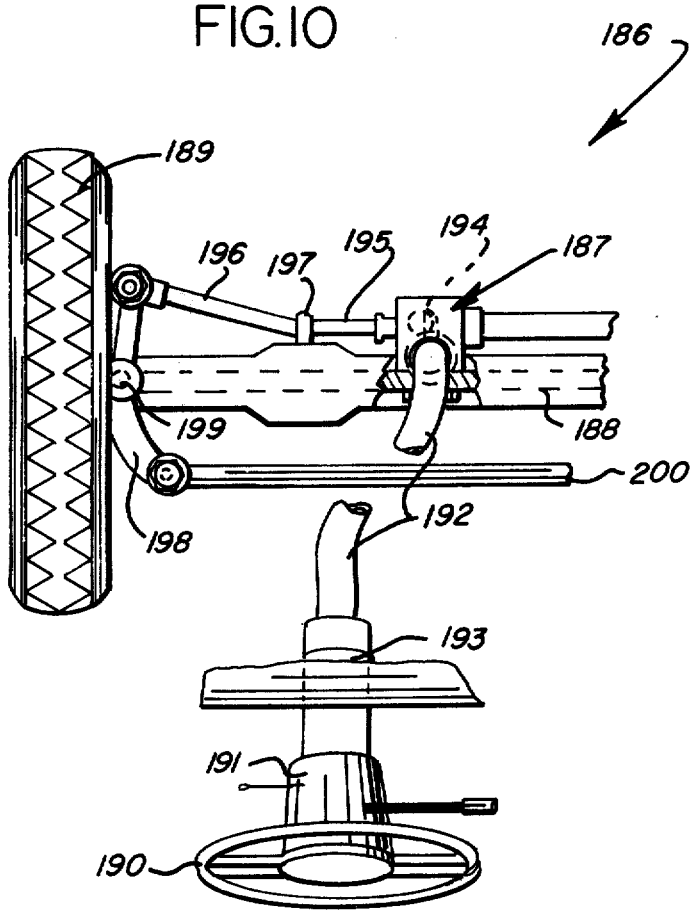
FIG. 10 is a top view depicting the use of the torque transmitting assembly of FIG. 2 to transmit torque to a rack and pinion steering mechanism which is mounted on an axle for up and down movement with a wheel of a vehicle.

In the embodiment of the invention illustrated in FIG. 10, a steering system 186 includes rack and pinion type steering mechanism 187 which is mounted on a solid axle 188 connected with a pair of steerable wheels 189 (only one of which is shown in FIG. 10). The axle 188 and steerable wheels are movable up and down together relative to the frame of the vehicle. Since a steering wheel 190 (illustrated schematically in FIG. 10) and steering column 191 are fixedly connected with the frame, and the wheel 189 and axle 188 move up and down relative to the frame, the position of the steering mechanism 187 varies relative to the position of the steering column.

To facilitate this up and down movement of the rack and pinion steering mechanism 187 relative to the steering wheel 190 and steering column 191, a flexible torque transmitting assembly 192 is utilized to interconnect the rotatable steering column shaft 193 and the rack and pinion steering mechanism. Upon rotation of the steering wheel 190, the steering column shaft 193 is rotated in the same manner as previously explained in connection with the steering column shaft 26 of FIG. 1. The flexible torque transmitting assembly 192 transmits rotational movement from the steering column shaft 193 to the rack and pinion steering mechanism 187. The torque transmitting assembly 192 is of the same construction as the torque transmitting assembly 30 of FIGS. 1–4 and has a flexible casing similar to the casing 64. It should be understood that the casing for the torque transmitting assembly 192 is mounted in such a manner that the axle 188 and steerable wheels are movable up and down relative to the frame upon which the steering column is mounted in a fixed relationship.

Upon rotation of the steering column shaft 193, the torque transmitting assembly 192 transmits rotational motion to a pinion, indicated schematically at 194 in FIG. 10, in the rack and pinion steering mechanism 187. Rotational movement of the pinion 194 moves the rack 195. Movement of the rack 195 is transmitted to a drag link 196 through a ball joint 197. Movement of the drag link 196 rotates a control arm 198 about a vertical king pin 199. The steerable wheel 189 moves with the control arm 198 about the king pin. The other steerable wheel (not shown) is simultaneously moved in a known manner by a tierod 200. The construction and mode of operation of the steering mechanism 187 is the same as disclosed in U.S. Pat. application Ser. No. 380,191, filed July 18, 1973, by Raymon L. Goff et al. and entitled "Vehicular Rack and Pinion Steering Gear."

Figure 11:
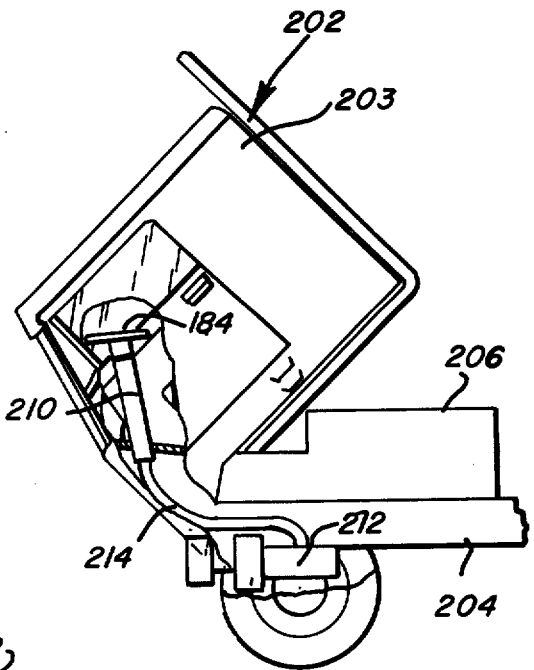
FIG. 11 is a schematic illustration depicting the use of the torque transmitting assembly of FIG. 2 in association with a vehicle having a tiltable operator's cab.

In the embodiment of the invention illustrated in FIG. 11, a vehicle 202 has a tiltable operator's cab or housing 203 which is pivoted in a known manner relative to a frame 204 of the vehicle 172 to provide access to an engine 206. When this occurs, the steering wheel 208 and steering column 210 are moved relative to a steering mechanism 212.

To provide for the transmission of rotational movement from the steering wheel 208 to the steering mechanism 206 and to facilitate tilting of the operator's cab 203, a flexible torque transmitting assembly of the same construction as the torque transmitting assembly 30 is provided between an output shaft from the steering wheel 208 and the steering mechanism 212. It should be understood that the torque transmitting assembly 214 has a flexible outer casing or housing and length such that the operator's cab 203 can be moved between the tilted position (shown in FIG. 11) and the normal or over-the-road operating position in which the cab is in an upright orientation relative to frame 204. The utilization of the torque transmitting assembly 214 in association with the tiltable operator's cab 203 eliminates the need for a relatively complicated arrangement of rotatable shafts and universal couplings which have previously been used in association with tiltable operator's cabs.

In view of the foregoing description, it can be seen that the torque transmitting assembly 30 is capable of transmitting torque along a curved path from a rotatable steering shaft in a steering column to a steering mechanism, such as a rack and pinion drive arrangement 14 (FIG. 1) or a wheel mounted steering mechanism 190 (FIG. 10). In addition, the torque transmitting assembly 30 can be used with a movable steering column 210 and a steering mechanism 212 (FIG. 11). The torque transmitting assembly 30 includes a series of rotatable torque transmitting bodies which are disposed in a continuous row. In one embodiment, the torque transmitting bodies 34 are provided with annular arrays of teeth 90 and 94 to transmit rotational movement and torque from the input member 38 to an input member 50. However, any of the illustrated torque transmitting bodies could be utilized in place of the torque transmitting bodies 34 if desired.

Although the torque transmitting assemblies have been described in connection with steering systems for three known types of vehicles, it is contemplated that the torque transmitting assemblies will be utilized in association with the steering systems of other known types of vehicles. The torque transmitting assemblies are particularly well adapted for transmitting rotational movement from a steering column to a steering mechanism in vehicles in which relative movement occurs between the steering column and steering mechanism. In addition, the torque transmitting assemblies are very well adapted for transmitting rotational movement along a nonlinear path around one or more objects, such as the engine of the vehicle.

Having described specific preferred embodiments of the invention, the following is claimed:

1. An apparatus for use in steering a vehicle, said apparatus comprising a steering column, a rotatable steering shaft disposed within said steering column, a manually rotatable input member disposed at one end portion of said steering column and connected with a first end portion of said steering shaft, said input member being rotatable to effect rotation of said steering shaft, drive means for turning at least one wheel of the vehicle in response to an input torque, said drive means being disposed forwardly and offset to one side of said steering shaft at a level lower than said input member, and torque transmitting means connected with a second end portion of said steering shaft for transmitting torque to said drive means along a path having both horizontally and vertically curved components in response to rotation of said steering shaft by said input member, said torque transmitting means comprising a series of adjacent torque transmitting bodies including a rotatable input body connected with said second end portion of said steering shaft, a rotatable output body connected with said drive means, a series of rotatable intermediate bodies disposed in a continuous row which extends between said input and output bodies along a nonlinear path having an arcuately curving portion of a length which is greater than the length of a plurality of said intermediate bodies, each one of said intermediate bodies having first surface means disposed in abutting engagement with a next preceding body for positively transmitting rotational motion between said preceding body and said one body without relative rotation between said one body and said preceeding body upon rotation of said steering shaft and variations in the torque transmitted to said drive means and second surface means disposed in abutting engagement with a next succeeding body for positively transmitting rotational motion between said one body and said next succeeding body without relative rotation between said one body and said preceeding body upon rotation of said steering shaft and variations in the torque transmitted to said drive means, each of said intermediate bodies having an outer surface portion which has a smooth circular cross sectional configuration in a plane extending perpendicular to the central axis of said intermediate body, an elongated tubular casing having a longitudinally extending central passage with both horizontally and vertically curved components, said passage having a side surface with a generally circular cross sectional configuration in a plane extending perpendicular to the central axis of said casing, said side surface of said passage being disposed in circumscribing abutting engagement with the smooth circular outer surface portion of each of said intermediate bodies to at least partially support said intermediate bodies for rotation about their central axis, and means for holding said tubular casing against rotatioinal movement during rotation of said intermediate bodies.

2. An apparatus as set forth in claim 1 wherein each of said intermediate bodies further includes third surface means for defining a central passage extending axially through the intermediate body, said apparatus further including an elongated flexible retaining means extending through said passages in said intermediate bodies for retaining said intermediate bodies in a row.

3. An apparatus as set forth in claim 1 further including means for connecting said drive means with the wheel for movement therewith relative to the frame of the vehicle, said torque transmitting means including means for enabling said intermediate bodies to move relative to each other to vary the configuration of the nonlinear path upon movement of said drive means with the wheel relative to the frame of the vehicle.

4. An apparatus as set forth in claim 1 further including means for enabling said manually rotatable input member to move relative to the frame of the vehicle along a second path extending transversely to the axis of rotation of said input member, said torque transmitting means including means for enabling said intermediate bodies to move relative to each other to vary the configuration of the nonlinear path upon movement of said rotatable input member along the second path.

5. An apparatus as set forth in claim 1 wherein said drive means includes a rack and pinion gear assembly adapted to be mounted on an axle of the vehicle for movement therewith relative to said steering shaft, said output body being connected with said rack and pinion gear assembly.

6. An apparatus as set forth in claim 1 wherein said first surface means on each of said intermediate bodies includes an annular array of teeth, said second surface means on each of said intermediate bodies includes a second annular array of teeth disposed in a coaxial relationship with said first annular array of teeth.

7. An apparatus as set forth in claim 1 wherein said first surface means includes an arcuate tooth projecting outwardly from one end portion of the associated one of said intermediate bodies and said second surface means includes arcuate recess means for receiving an arcuate tooth on a next adjacent one of said intermediate bodies.

8. An apparatus as set forth in claim 1 wherein said first and second surface means on some of said intermediate bodies includes arcuate teeth extending outwardly from opposite end portions of said bodies and wherein said first and second surface means on other of said intermediate bodies includes arcuate recess means formed in opposite end portions of said other bodies for receiving said arucate teeth.

* * * * *